United States Patent

[11] 3,599,626

| [72] | Inventor | Clyde W. Bouse |
| | | Clearwater, Fla. |
| [21] | Appl. No. | 875,913 |
| [22] | Filed | Nov. 12, 1969 |
| [45] | Patented | Aug. 17, 1971 |
| [73] | Assignee | Richard D. Wachtler |
| | | Clearwater, Fla. |
| | | a part interest |

[54] SOLAR HEATER FOR SWIM POOLS
2 Claims, 3 Drawing Figs.

| [52] | U.S. Cl. | 126/271 |
| [51] | Int. Cl. | F24j 3/02 |
| [50] | Field of Search | 126/270, 271 |

[56] References Cited
UNITED STATES PATENTS

| 1,473,018 | 11/1923 | Danner | 126/271 |
| 2,342,211 | 2/1944 | Newton | 126/271 X |
| 3,107,052 | 10/1963 | Garrison | 126/271 X |
| 3,299,881 | 1/1967 | Koch | 126/271 |
| 1,425,174 | 8/1922 | Cartter et al. | 126/271 |

FOREIGN PATENTS

| 529,163 | 9/1921 | France | 126/271 |

*Primary Examiner*—Charles J. Myhre
*Attorney*—Rummler and Snow

ABSTRACT: A closed circuit solar water heater in which a sun heated fluid is gravitationally circulated to and from a heat exchanger and control unit in the form of a tanklike receptacle for heating an independent water system circulating through a pipe coil within the said receptacle, the solar heater including coils of copper tubes leading from the bottom of the heat exchanger and control unit and disposed to be heated by sun rays, the said coils receiving the fluid to be heated and then returning the heated fluid into the heat exchanger and control unit near the top thereof for gravitational circulation therethrough, and pump means controlled by the control unit for causing flow of water through the said independent water system and operable only when the temperature of the sun heated fluid in the control unit is above a predetermined level.

PATENTED AUG 17 1971
3,599,626
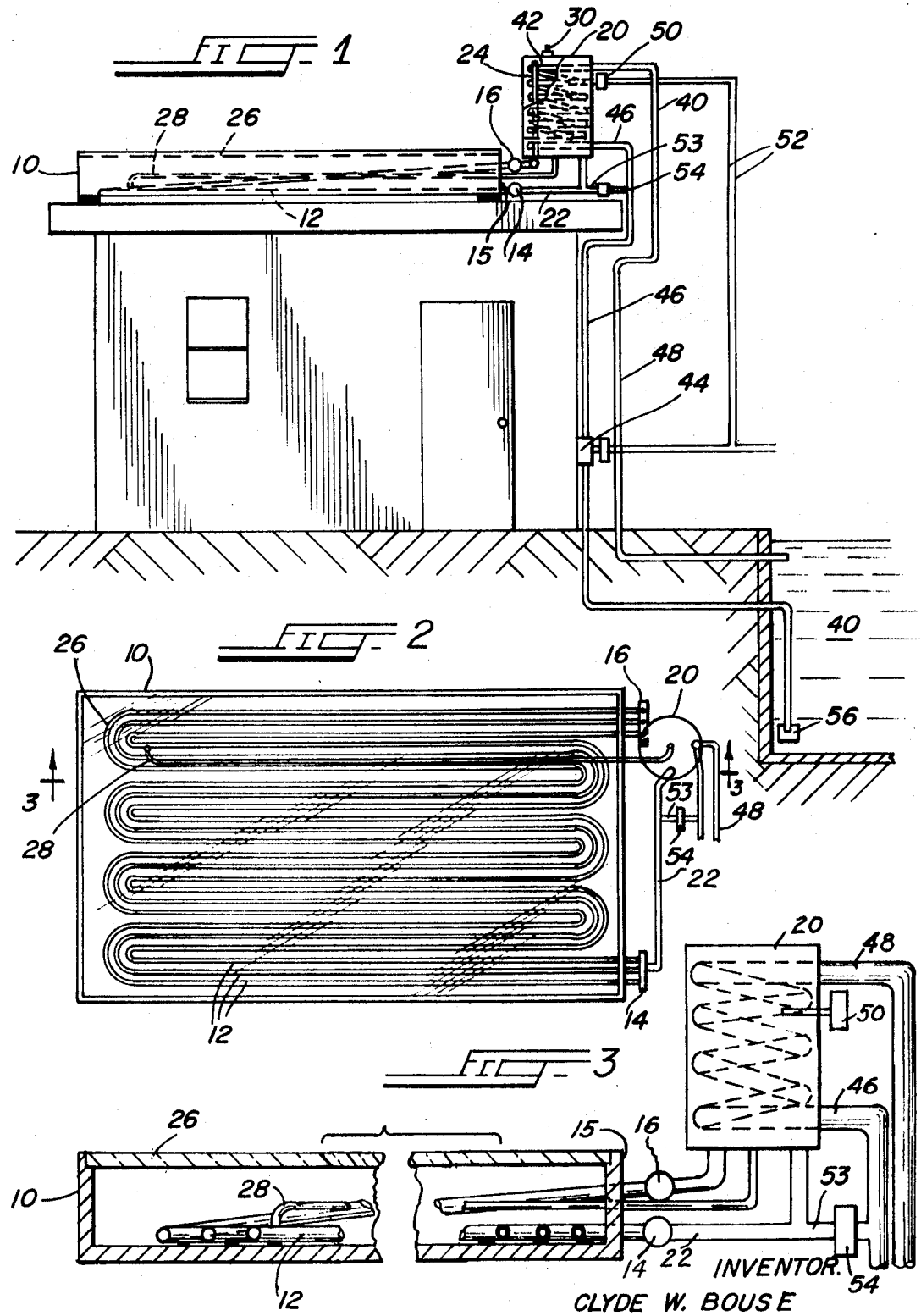
INVENTOR.
CLYDE W. BOUSE
BY Rummler & Snow
ATTYS.

3,599,626

SOLAR HEATER FOR SWIM POOLS

BACKGROUND OF THE INVENTION

This invention pertains to solar water heaters and particularly to such devices adapted to supply heat derived from solar energy however, the swim pools and other water reservoir systems wherein an independent and automatically operating heat source may be desired. Many systems have been devised for absorbing the heat of solar radiation and automatically transferring that heat to water or other suitable heat storage fluid and in due to useless the apparatus involved comprises a coil of suitable heat absorbing tubing through which the fluid to be heated by solar radiation is caused to flow in heat exchange relation with the tubing, the tubing being disposed in such a manner as to be heated by both direct and reflected sun rays. Numerous solar heating systems have been proposed and used for heating the water of swim pools and other water storage reservoirs, either as a primary or supplemental heat source. In such systems, however, the pool or reservoir water is positively circulated through the solar heater at a substantially constant rate, regardless of the amount of solar energy available to the heater, with the result that operation of the system is often quite inefficient due to useless pump operation and circulation of unheated water from the heater to the pool or reservoir.

SUMMARY OF THE INVENTION

The present invention seeks to over come the aforesaid difficulty by providing a solar heating system in which the fluid circulating through the solar heater is wholly independent of the water of the pool or storage reservoir and moves in a closed circuit between the sun heated coils and a heat exchanging control unit automatically and continuously as long as the coils are heated by the sun, such circulation being at a rate directly related to the intensity of the sun rays affecting the heater coils. In this system the pool or reservoir water is circulated independently through the heat exchanger control unit by means of a pump which is under automatic control by the control unit to operate only when the temperature of the control unit is above a predetermined figure.

The control unit is a closed hollow receptacle positioned immediately above the solar heater coils and from which the fluid to be sun heated flows gravitationally into the heater coils and thence back to the control unit where it is delivered close to the top of the unit. The water from the pool or storage reservoir passes through the control unit by way of a heat conducting coil entering the control unit near its bottom and leaving adjacent its top. This coil serves as the heat exchanger of transfer means between the sun heated fluid in the control unit and the water of the pool or storage reservoir and thermostatically responsive means is provided in the control unit for controlling the pump and regulating the flow of the water to which the sun heat is to be transferred.

Thus, an essential concept of the present invention is to provide separate and independent flow systems for the solar heated fluid and the water of the main pool or reservoir to which the solar heat is to be delivered and to cause a heat transfer from the one system to the other only when the temperature of the solar heated fluid is above a predetermined level.

BRIEF DESCRIPTION OF THE DRAWINGS

A specific embodiment of this invention is shown in the accompanying drawing in which:

FIG. 1 is an elevational view showing the improved solar heater mounted on the roof of a swim pool equipment house and arranged for heating the pool water;

FIG. 2 is a plan view of the solar heater showing an arrangement of the coils for the fluid to be heated; and FIG. 3 is an enlarged elevational view of the solar heater as taken on the line 3–3 of FIG. 2.

DESCRIPTION OF THE PREFERRED EMBODIMENT

As shown in the drawings, my improved solar heater, as arranged for heating the water of a swim pool, comprises a flat bottomed pan 10 across which coils of heat conductive tubing 12 are sinuously arranged for direct exposure to sun rays, each coil comprising a single tube running from a delivery manifold 14 at one side of one end 15 of the pan 10 and extending back and forth in serpentine loops over the bottom of the pan to a discharge manifold 16 at the opposite side of the said one end 15 of the pan. In the form shown, three coils are provided and the tubes thereof are disposed side-by-side on the bottom of the pan, to which they are preferably spot soldered, extending substantially the length of the pan in parallel sets connected by 180° bends at alternate ends so that each tube provides an uninterrupted passage from manifold to manifold. All of the tube sets are in a common plane except the last, which terminates at the discharge manifold 16. This last set of three tubes is arranged to rise progressively from the bottom of the pan 10 adjacent one end of the discharge manifold 16 at the opposite end, so that the outlet end of the coils is at a higher level than the inlet end.

The manifolds 14 and 16 are connected directly to a control unit 20 which comprises a closed tanklike receptacle, of about 10 gallon capacity, located directly above the solar heater pan 10, the manifold 14 being connected into the bottom of the control unit by a pipe 22 and the manifold 16 being connected to a riser pipe 24 which enters the control unit at its bottom and extends to within a short distance of its top. Thus the control unit provides a closed circuit for flow of the fluid that the solar heater is intended to handle.

Preferably the interior of the pan 10 and the tubing therein are coated with a flat black paint to provide for maximum absorption of the solar heat and the top of the pan is covered and sealed by a plate glass panel 26 which is suitably secured so as to be water tight. Thus, when the system is filled with a suitable carrying fluid, for example, water, the sun heat will warm the fluid in the tubes 12 and it will be caused to flow upwardly into the control unit 20 and be replaced by cooler fluid from the bottom of the control unit entering the coils by way of the manifold 14.

In order to equalize the pressure in the system and permit a free circulation of heated fluid from the heater coils 12 to the control unit 20 through the riser pipe 24, a relatively small copper tube 28 is connected between the bottom of the control unit 20 and the heater coils at a point close to where the last set of the coil tubes begins to rise toward the manifold 16. Also, to clear the system of air and assure its being filled with heat carrying fluid, a petcock 30 may be provided in the top of the control unit 20.

The control unit 20 of the solar heater system is the means by which the heat collected by the system is efficiently transferred to an associated system, where its presence is desired, in the present instance a swimming pool 40, and to effect such heat transfer a coil 42, of heat conducting material such as copper, is housed within the control unit 20. Water from the associate system is forced by a pump 44 to circulate through the coil 42 in the control unit, the water entering at the bottom of the coil 42 through the pipe 46 and leaving at the top of the coil 42 through the return pipe 48. As shown, the pump 44 is located in the supply pipe 46.

Operation of the pump 44, and hence flow of the fluid to be heated on the control unit 20, is automatically controlled by an aquastat 50 located near the upper end of the control unit, but below the outlet end of the riser pipe 24 which delivers the sun heated water to the control unit. This aquastat 50, through the leads 52, turns the pump on and off accordingly to changes in temperature of the sun heated fluid flowing through the control unit. Thus the pump is operated only when sun heated water is supplied to the control unit and whenever the temperature drops below a predetermined level the pump is stopped. Thus circulation of water through the coil 42 occurs only when the fluid in the system of the control unit is sufficiently warm and circulation is automatically stopped when solar heat is not sufficiently available.

In most cases, the heat carrying fluid filling the solar heater system will be water and when water is the fluid of the associated system, as in a swimming pool, a connection 53 containing a pressure regular 54 is provided between the supply line 46, from the pool 40, and the supply pipe 22 leading from the bottom of the control unit 20 to the manifold 14 supplying the coils 12. This connection 53 assures the closed circuit of the solar heater system to be filled with water under a suitable pressure at all times. As shown in FIG. 1, a foot valve 56 is installed in the pool end of the pipe 46 so as to keep the pump 44 primed.

In a typical solar heater system for swim pools, the solar heater may be a pan 5 feet wide and 9 feet long, with depth of 7 inches, made from 16 ounce sheet copper and the heating coils 12 may be of ⅝-inch outside-diameter copper tubing. The last set of coil pipes may then have a rise of 5 inches in 8 feet from the pan bottom to reach the manifold 16. The riser 24 leading from the manifold 16 and the connection 22 leading from the control unit to the manifold 14 may each be of ¾-inch inside-diameter copper tubing; and the pressure equalizing line 28 and the connection 52 between the line 46, from the pool, and the line 22 to the heater manifold 14 may be made of ¼-inch inside-diameter copper tubing. The control unit may be a receptacle of about 10 to 15 gallon capacity made of a good heat conductive material.

In such a solar heater the length of each tube would be about 30 feet when arranged in four sets of tubes, as illustrated in FIG. 2. Thus the relatively small diameter of the fluid stream flowing through each tube, in relation to the area of the tube surface subject to the sun heat, and the division of the total fluid volume passing to and from the control unit into a plurality of narrow streams, results in a very rapid heating of the fluid and a relatively fast flow to and from the control unit. Heater efficiency is thereby greatly enchanced and a relatively small heater area is capable of collecting enough sun heat to warm an average home-size swim pool during daylight hours of sunshine and thereby compensate for heat loss from the pool during the nighttime.

It will be understood that other water storage or reservoir systems may be heated automatically by the herein disclosed solar heater system. For example, in insulated storage tank may be connected to the coil within the control unit 20 and the solar heater could then produce hot water for domestic use.

I claim:

1. A solar heater of the class described comprising a plurality of tubes extending from a common inlet manifold and arranged sinuously over an area exposed to solar radiation, an outlet manifold serving as a terminus for said tubes, the tubes extending between the inlet and outlet manifolds being arranged in parallel sets connected in series by 180° bends at alternate ends whereby each tube provides a individual passage from manifold to manifold and the set of tubes connected to the outlet manifold being inclined upwardly to enter the outlet manifold at a higher level than that of the inlet manifold, a hollow receptacle disposed above said outlet manifold, a pressure equalizing tube connecting one of the heater tubes directly into the bottom of the receptacle from a point adjacent that where the set of tubes connected to the outlet manifold begins to rise, a riser pipe leading from the outlet manifold and opening into said receptacle adjacent the top thereof, a pipe connected to said inlet manifold and opening into the bottom of the receptacle, and a heat carrying liquid filling said receptacle and said tubes.

2. A solar heater according to claim 1 wherein heat exchanger means is disposed within the receptacle for transferring heat from sun-heated liquid therein to a independent associated system for circulating a liquid like that filling said receptacle and tubes, and a connection including a flow controlling pressure regulator is provided between the associated system and the bottom of said receptacle.